US010956232B2

(12) United States Patent
Beard et al.

(10) Patent No.: US 10,956,232 B2
(45) Date of Patent: Mar. 23, 2021

(54) INSTRUCTING THE USE OF APPLICATION PROGRAMMING INTERFACE COMMANDS IN A RUNTIME ENVIRONMENT

(71) Applicant: INTERNATIONAL BUSINESS MACHINES CORPORATION, Armonk, NY (US)

(72) Inventors: Darren R. Beard, Chandlers Ford (GB); Colin R. Penfold, Ropley (GB); Ian J. Mitchell, Eastleigh (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/547,689

(22) Filed: Aug. 22, 2019

(65) Prior Publication Data

US 2019/0377615 A1 Dec. 12, 2019

Related U.S. Application Data

(63) Continuation of application No. 16/002,308, filed on Jun. 7, 2018, now Pat. No. 10,452,454.

(51) Int. Cl.
*G06F 9/54* (2006.01)
(52) U.S. Cl.
CPC ..................... *G06F 9/54* (2013.01)
(58) Field of Classification Search
None
See application file for complete search history.

(56) References Cited

U.S. PATENT DOCUMENTS

| 6,636,521 | B1 | 10/2003 | Giulianelli |
| 7,319,948 | B2 | 1/2008 | Levin |
| 8,117,589 | B2 | 2/2012 | Christensen |
| 8,881,129 | B1* | 11/2014 | McKinnon ............ G06Q 10/10 |
| | | | 717/168 |
| 9,443,080 | B2 | 9/2016 | Reierson |
| 10,452,454 | B1 | 10/2019 | Beard |
| 2003/0236827 | A1* | 12/2003 | Patel ...................... H04L 69/32 |
| | | | 709/203 |

(Continued)

OTHER PUBLICATIONS

IBM: List of IBM Patents or Patent Applications Treated As Related (Appendix P), Aug. 16, 2019, 2 pages.

(Continued)

*Primary Examiner* — Craig C Dorais
(74) *Attorney, Agent, or Firm* — Alexis N. Hatzis

(57) ABSTRACT

A method, computer system, and a computer program product for instructing the use of application programming interface (API) commands in a runtime environment is provided. The present invention may include receiving, by a computer processor, a source code with a high level language API command. The present invention may include accessing, by a computer processor, metadata for the source code and determining whether the metadata includes an instruction to be applied to the high level language API command, and applying, by a computer processor, the instruction to the high level language API command. The present invention may include processing, by a computer processor, the high level language API command to a low level code using a command translator, wherein the processing occurs after the applying the instruction.

18 Claims, 6 Drawing Sheets

(56) References Cited

U.S. PATENT DOCUMENTS

| | | | |
|---|---|---|---|
| 2004/0093604 A1* | 5/2004 | Demsey | G06T 1/60 719/310 |
| 2013/0300752 A1 | 11/2013 | Grover | |
| 2018/0349191 A1 | 12/2018 | Dorsey | |
| 2020/0019410 A1* | 1/2020 | Dima | G06F 9/448 |

OTHER PUBLICATIONS

Pending U.S. Appl. No. 16/002,308, entitled "Instructing the Use of Application Programming Interface Commands in a Runtime Environment", filed Jun. 7, 2018, 36 Pages.

Autho, "Restrict Application or User Requests for API Scopes," Total Economic Impact of Auth0, https://auth0.com/docs/api-auth/restrict-requests-for-scopes, Printed on Apr. 7, 2018, pp. 1-5.

Google Cloud, "Restricting API Access with API Keys," Cloud Endpoints, Open API, https://cloud.google.com/endpoints/docs/openapi/restricting-api-access-with-api-keys-openapi, Printed on Apr. 7, 2018, pp. 1-7.

Mell et al., "The NIST Definition of Cloud Computing," National Institute of Standards and Technology, U.S. Department of Commerce, Special Publication 800-145, Sep. 2011, pp. 1-7.

Stack Exchange, "How to avoid unauthorised use of an API?" Software Engineering, https://softwareengineering.stackexchange.com/questions/229859/how-to-avoid-unauthorized-use-of-an-api, Printed on May 15, 2018, pp. 1-1.

\* cited by examiner

INSTRUCTING THE USE OF APPLICATION PROGRAMMING INTERFACE COMMANDS IN A RUNTIME ENVIRONMENT

BACKGROUND

The present invention relates to controlling the use of application programming interface (API) commands in programs which will execute in a runtime environment, and more specifically, to restricting the use of API commands at a granularity finer than a version or release of the runtime environment.

Computer programs may include embedded API commands in a high level language that may require translation into a lower level runtime programming language. The embedded API commands may be translated during a pre-compile translation step, which may convert the embedded API commands into call statements to a stub subroutine in the runtime programming language.

Embedded API commands may, for example, be used in transaction processing middleware and database batch processing. As a specific example, Customer Information Control System (CICS®) (CICS and all CICS-based trademarks are trademarks or registered trademarks of International Business Machines Corporation in the United States, and/or other countries) is middleware which supports transaction processing and may embed EXEC CICS commands within CICS® code that require translation at the time of program compilation.

A product supplier may choose to change the API commands that it makes available with each release of a given product. However, a provider of a runtime environment of the product may not want to make all of the changes in a release immediately available to the product's users. For example, a provider of a runtime environment of the product may want to prevent the use of a particular API command or feature until such time as the particular API command or feature has been carefully tested in the product's operating environment.

Currently, this may be achieved by restricting the use of the API command to the API command which was available in a previous release of the product. However, this may result in a lack of granularity for the product (i.e., program) user.

SUMMARY

According to an embodiment of the present invention there is provided a computer-implemented method for instructing the use of application programming interface (API) commands in a runtime environment carried out by a command translator. The present invention may include receiving, by a computer processor, a source code with a high level language API command. The present invention may include accessing, by a computer processor, metadata for the source code and determining whether the metadata includes an instruction to be applied to the high level language API command, and applying, by a computer processor, the instruction to the high level language API command. The present invention may include processing, by a computer processor, the high level language API command to a low level code using a command translator, wherein the processing occurs after the applying the instruction.

According to another embodiment of the present invention there is provided a computer system for instructing the use of application programming interface (API) commands in a runtime environment, comprising one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising: receiving, by a computer processor, a source code with a high level language API command; accessing, by a computer processor, metadata for the source code and determining whether the metadata includes an instruction to be applied to the high level language API command, and applying, by a computer processor, the instruction to the high level language API command; and processing, by a computer processor, the high level language API command to a low level code using a command translator, wherein the processing occurs after the applying the instruction.

According to a further embodiment of the present invention there is provided a computer program product for instructing the use of application programming interface (API) commands in a runtime environment, the computer program product comprising one or more computer-readable storage media and program instructions stored on at least one of the one or more tangible storage media, the program instructions executable by a processor to cause the processor to perform a method comprising: receiving, by a computer processor, a source code with a high level language API command; accessing, by a computer processor, metadata for the source code and determining whether the metadata includes an instruction to be applied to the high level language API command; responsive to determining that the metadata includes an instruction to be applied to the high level language API command, applying, by a computer processor, the instruction to the high level language API command; and processing, by a computer processor, the high level language API command to a low level code using a command translator, wherein the processing occurs after the applying the instruction.

BRIEF DESCRIPTION OF THE SEVERAL VIEWS OF THE DRAWINGS

The subject matter regarded as the invention is particularly pointed out and distinctly claimed in the concluding portion of the specification. The invention, both as to organization and method of operation, together with objects, features, and advantages thereof, may best be understood by reference to the following detailed description when read with the accompanying drawings.

Preferred embodiments of the present invention will be described, by way of example only, with reference to the following drawings in which.

Figure 1:
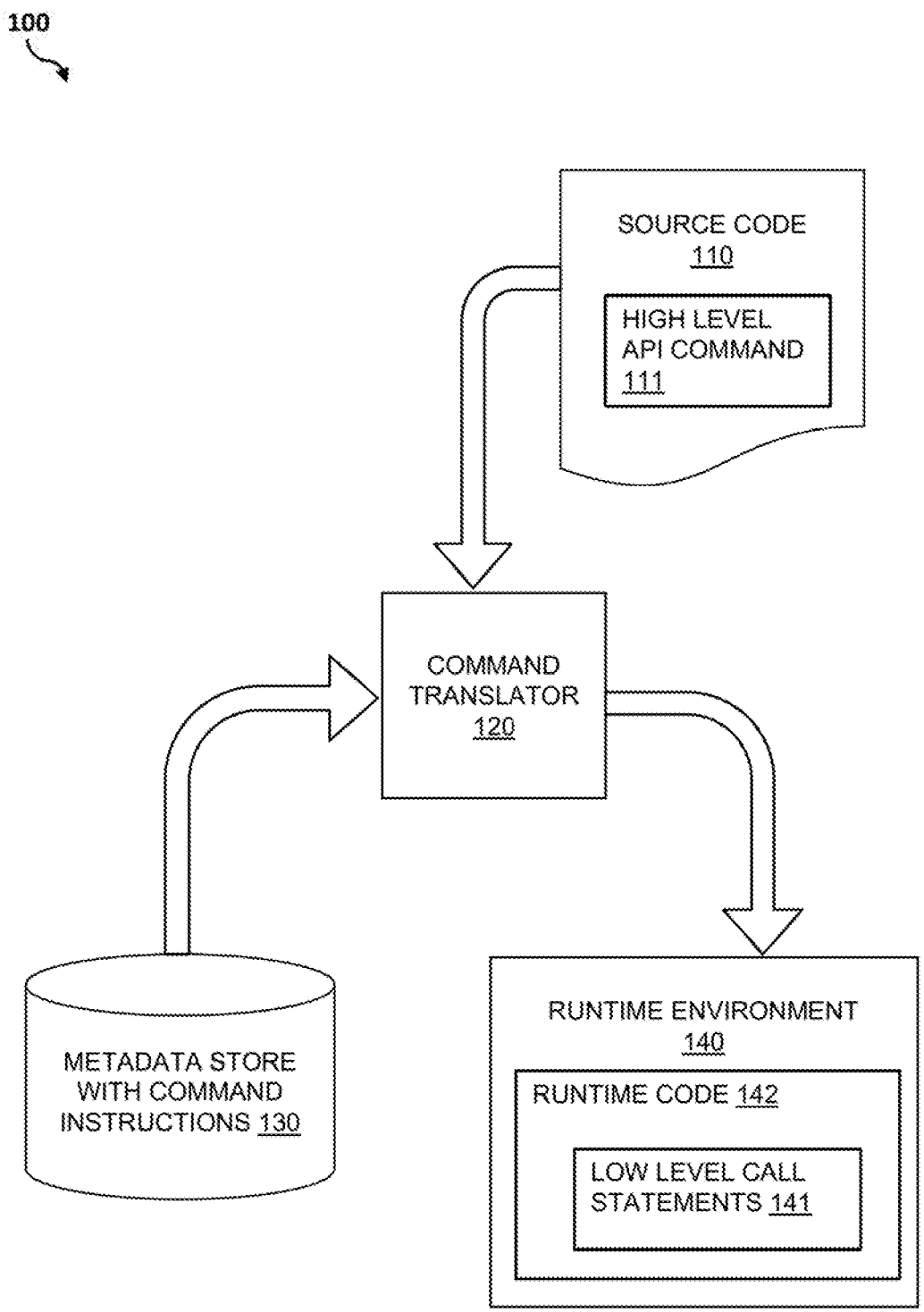
FIG. 1 is a schematic diagram of a system in which the present invention may be implemented.

It may be appreciated that for simplicity and clarity of illustration, elements shown in the figures have not been drawn to scale. For example, the dimensions of some of the elements may be exaggerated relative to other elements for clarity. Further, where considered appropriate, reference numbers may be repeated among the figures to indicate corresponding or analogous features.

DETAILED DESCRIPTION

In computer programming, a source code (i.e., a source code for a program) may be processed into an executable form before being deployed into a runtime environment. Inputted source code for a program may include embedded application programming interface (API) commands in a high level language that may require translation into a lower level runtime programming language (i.e., low level code, low level programming language). An API may be a set of commands that computer programmers may use to create software, access a file system, or perform file operations, including many other tasks. The embedded API commands in a computer program may be translated as a pre-compile translation step, which may convert the embedded API commands into call statements to a stub subroutine in the runtime programming language.

The source code with embedded high level language API commands may be processed by a command translator to convert the high level language API commands into executable code in a language of the program so that a runtime environment can understand the high level language API commands.

A command translator may take a high level language API command embedded in the source code, and may convert or translate the embedded high level language API command into code suitable for the language of the application program. According to at least one embodiment, the functions performed by the command translator 120 may be performed by a compiler, or during a phase of compilation, as will be understood by one of ordinary skill in the art.

In the described method and system, metadata may be provided to be examined at the command translator to see if a high level language API command is to be allowed into the runtime environment. Metadata may be used to provide instructions to determine which high level language API commands are to be allowed, restricted, or have a warning applied to their use.

According to at least one embodiment, the metadata may be provided by the runtime environment owner to control the high level language API commands available in the runtime environment. A runtime environment owner may include an individual user of the product, including a supplier of the product and/or a deployer of the program (e.g., including a client using CICS®, which will be described in more detail below, to run a business).

According to at least one embodiment of the present invention, the metadata may be provided by the high level language API command supplier, to give finer granularity to the control of the high level language API command than may be provided for in a new software or computer program release.

A command translator may be given (i.e., read, inputted) source code and may translate high level language API commands included in the inputted source code into a format (e.g., a programming language) that a runtime environment may understand. A runtime environment may understand low level call statements in an executable language. In the inputted source code, many normal language statements may remain unchanged, but many high level language API commands may be translated into low level API call statements in a format required by the language in which the program is being coded.

According to at least one embodiment of the present invention, a Customer Information Control System (CICS®) environment may be used. A CICS® environment provides application servers for online transaction management and connectivity, and provides high level language API commands for transactional processing logic. A CICS® environment may also enable database batch processing using high level language API commands.

In a CICS® runtime environment, most of the processing logic may be expressed in standard language statements, but to access program resources that are managed by CICS®, and to request services, the CICS® application programming interface (API) may be used. The CICS® API may provide a rich set of commands that can be used to write applications that support businesses while shielding the user from the complexities of managing a transaction processing environment. The CICS® command format may use "EXEC CICS commandname option option . . . " and this format may be used, for example, in programs written in COBOL (common business-oriented language), C, C++, Assembler and PL/I (Programming Language One).

In a CICS® runtime environment, the command translator may translate EXEC CICS commands into call statements in the language of the runtime environment. The command translator may be provided at a pre-processing step or may be called by the compiler during compilation. The CICS® runtime environment may run a translated and compiled CICS® application in a production environment, which may be a distributed environment, distributed across multiple domains. According to at least one embodiment, the functions performed by the command translator 120 may be performed by a compiler, or during a phase of compilation, as will be understood by one of ordinary skill in the art.

Translating the high level language API command into a low level code using the command translator may occur after accessing the metadata, as described previously, and as will be described in more detail below. The command translator may take a CICS® command from the inputted source code, such as EXEC CICS WRITEQ, and may convert (i.e., translate) the CICS® command into a low level code which may be suitable for the language of the application. As described previously, for CICS commands, the translated commands may be in COBOL, C, or C++, among other programming languages.

According to at least one embodiment of the present invention, when the command translator is about to process a high level language API command, the command translator may determine (i.e., check) whether there are any instructions to be applied before handling the high level language API command. Handling the high level language API command may include acting in accordance with the high level language API command.

If the high level language API command has instructions to be applied, then the command translator may act in accordance with the instructions. Instructions may include issuing messages warning the user of a command, restricting the use of a command by failing the translation step for commands that are not allowed, or allowing a command that has been provided for in the source code but is either switched off or dormant, among other things. If there are instructions which result in messages being issued, then handling the high level language API command may mean either processing the high level language API command as normal (e.g., for a warning), or moving on to the next instruction (e.g., for a disallow). When a warning message is issued, the high level language API command may still be translated into a low level code. However, when a disallow message is issued, the high level language API command may not be translated into a low level code.

If the high level language API command does not have instructions to be applied, then handling the high level language API command may mean commenting out any EXEC CICS commands and substituting the EXEC CICS commands for instructions in the low level programming language (i.e., low level code).

Using suitable metadata, instructions may be applied to part of a high level language API command. Where a high level language API command has several parameters, it may be possible to restrict some parameters while allowing others. This may give a finer granularity to the high level language API control.

Referring to FIG. 1, a schematic diagram 100 illustrates an example embodiment of a system environment in which the described method and system may be implemented.

A command translator 120 may read (i.e., receive) source code 110 including high level API commands 111 (i.e., high level language API commands) as part of the program. The command translator 120 may translate the high level API commands 111 of the source code 110 into low level call statements 141, which may be suitable for execution in the runtime environment 140.

The described method and system provide metadata from a metadata store with command instructions 130, where the metadata provides restrictions or instructions on the high level API commands 111 in the source code 110. The command translator 120 references the metadata store with command instructions 130 as it translates the high level API commands 111 of the source code 110 and applies the instructions to the high level API commands 111 before handling the high level API commands 111. One metadata store with command instructions 130 may contain all the instructions to be applied in a runtime environment with multiple command instructions specified in the metadata store with command instructions 130.

The runtime environment 140 may receive runtime code 142 which may include low level call statements 141 within the runtime code 142, which may be compiled for the runtime environment 140. The runtime code 142 may include low level call statements 141 according to the specified instructions on the API commands provided in the metadata store with command instructions 130.

According to at least one embodiment, the metadata store with command instructions 130 with instructions for API commands may be provided by the owner of the runtime environment 140 so that the owner can control the API commands available to developers of programs for the runtime environment 140. The owner of the runtime environment 140 can choose to restrict or allow an API command as required for a given production environment.

Product documentation may show all API commands that can be coded. If there is a command, which a runtime owner does not want to allow, the runtime owner may code restrictions. An owner of a runtime environment wishing to instruct a restriction or permission of an API command, may code the metadata including the command name and an instruction keyword.

According to at least one other embodiment, the metadata store with command instructions 130 with instructions for an API command may be provided by the source code supplier to enable a finer granularity of instructions on API commands than may be provided by a separate release of the source code 110.

Metadata instructions may be coded at any time, including but not limited to when a new release of a product with a new API is deployed.

Figure 2:
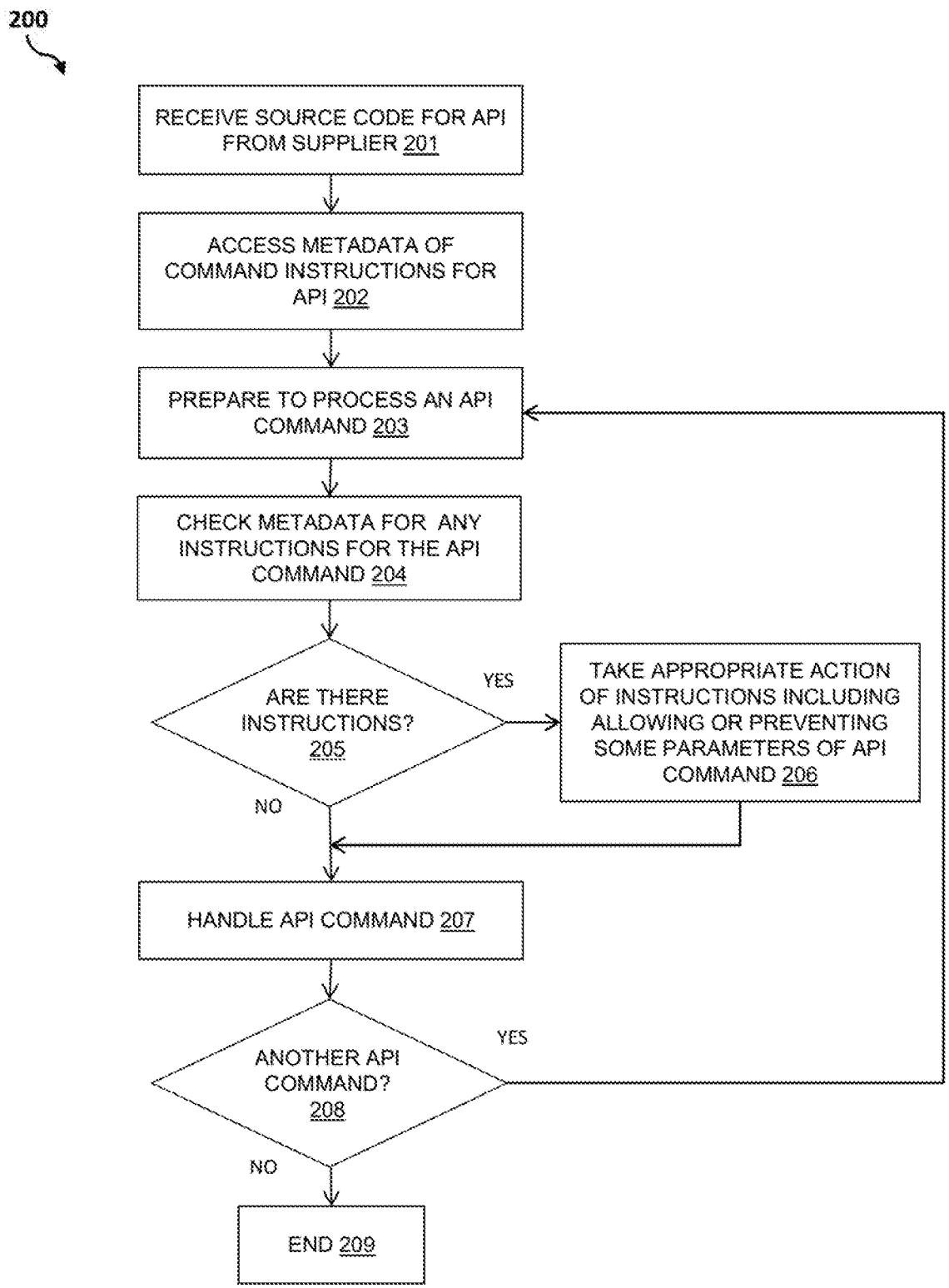
FIG. 2 is a flow diagram of an example embodiment of a method in accordance with the present invention.

Referring to FIG. 2, a flow diagram 200 shows an example embodiment of a method as carried out by a command translator 120 when processing source code 110 to translate high level language API commands to low level call statements in the execution language.

At 201, the command translator 120 receives, from a supplier, source code for a program containing high level language API commands. Received source code for a program may be processed into an executable form before being deployed into a runtime environment. Source code for a program may include embedded high level language API commands which may be required to be translated into a lower level runtime programming language (i.e., low level code).

At 202, the command translator 120 accesses metadata of command instructions for the API commands. A command translator may access a command and may convert (i.e., translate) the accessed command into a low level code which is suitable for the language of the application program.

For example, in CICS®, the command translator 120 may be a set of programs known collectively as the command translator 120. High level language API commands may be processed by the command translator 120. As part of the processing of a high level language API command, a check may be made against what was stored in a metadata component (e.g., a PDS member for the CICS® implementation). Based on the check, a high level language API command may either be translated as normal, a high level language API command may be completely disallowed, or a warning message may be issued. Whether a high level language API command may be translated as normal, whether a high level language API command may be disallowed, or whether a warning message may be issued, may be specific to the high level language API command being processed.

The above-mentioned example refers to implementations involving CICS®, however it would be understood by one of ordinary skill in the art that other high level language API commands may be used.

At 203, the command translator 120 prepares to process an API command for translation. Preparing to process the high level language API command (i.e., an API command) for translation includes locating the command in the inputted source code (i.e., the source code for the program).

At 204, the command translator 120 determines whether the metadata contains instructions for the API command. A determination as to whether the metadata contains instructions for the API command may be made by checking the metadata for instructions for the API command. This may be carried out by identifying the command name and searching for an instruction keyword for the command keyword. An instruction keyword may be used to signify action by the command translator 120. Action taken by the command translator 120 may include issuing a message and/or preventing the use of an API command.

For example, in CICS® commands, a command keyword may be a verb identifying the command action that may be used to identify the command.

At 205, the command translator 120 determines if there is an instruction to be applied to the API command. If there is an instruction to be applied to the high level language API command (i.e., the API command), then at 206, appropriate action may be taken pursuant to the instruction, including but not limited to allowing or preventing parameters of the high level language API command in the translated code, or issuing a warning. An issued warning may relate to some, but not all, parameters of the API command.

Applying instructions to the high level language API command may result in processing the high level language API command as normal (e.g., for a warning instruction), or moving on to the next instruction (e.g., for a disallow instruction). When a warning message is issued, the high level language API command may still be translated into a low level code. However, when a disallow message is issued, the high level language API command may not be translated into a low level code.

If, at 205, the command translator 120 determined that there were no instructions to be applied to the API command, then at 207, the command translator 120 handles the API command. Handling the API command may include translating the API command as normal, disallowing the API command, or issuing a warning message, depending on the instructions and the API command being processed.

Continuing with the CICS® example, as mentioned previously, if the high level language API command does not have instructions to be applied, then handling the high level language API command may mean commenting out any EXEC CICS commands and substituting the EXEC CICS commands for instructions in the low level programming language (i.e., low level code).

At 208, the command translator 120 determines if the received source code contains another API command. If there is another API command (i.e., high level language API command) in the source code, then the method carried out by the command translator 120 prepares to process the next API command (i.e., high level language API command) at 203.

If there is not another API command in the received source code, then at 209, the method carried out by the command translator 120 ends.

For example, the implementation in CICS® may require a partitioned data set (PDS) member to store the metadata. Another implementation may use a file, among many other implementation options. As described previously, although the implementation herein is described to involve CICS®, it would be understood by one of ordinary skill in the art that other API commands may be used.

The metadata may include an instruction keyword followed by details of the command to be restricted. The system may know to look for keywords contained within the metadata by scanning through the metadata to determine whether a keyword identified in the metadata matches the instruction keyword. For example, if the system is required to disallow use of the EXEC CICS WRITEQ TS command, then the end user may code DISALLOW WRITEQ TS in the metadata file. In this case, the command translator 120 may scan through the received source code to look for EXEC CICS commands to translate. If, for example, EXEC CICS START is found, this is not a match to the metadata, so the command may be translated normally (e.g., routinely). However, if EXEC CICS WRITEQ TS is found, this is a match to what is contained in the metadata. In this case, the restriction to be applied may be DISALLOW. The command translator 120 may issue a message and may not translate the located command.

Furthermore, each entry in the metadata may contain an action word (e.g., WARN, DISALLOW) followed by one or more words which constitute the command and follow EXEC CICS in a command string, such as WRITEQ TS, for example.

Continuing with the above example concerning the CICS® implementation, the instruction keywords contained within the metadata may include DISALLOW, ALLOW or WARN.

An instruction keyword of DISALLOW may instruct a restriction on the API command to not allow the API command in the runtime environment. In this case, the translation step may fail, and there may not be a valid code to deploy for this API command in the runtime environment. An instruction keyword of DISALLOW may allow issuance of a message in the translation step.

An instruction keyword of ALLOW may instruct a previously dormant or switched off API command to be activated in the runtime environment. In this case, the translation step may provide the valid code for deployment of the API command in the runtime environment. This may be used if a program supplier has not carried out sufficient testing of the API command and ships the code with the API command switched off. The API command may be switched on later by the owner of the runtime environment, or by the program supplier, by providing the metadata instruction.

An instruction keyword of WARN may issue a message during the translation step, with no runtime changes.

For example, CICS® commands may be coded in the following form:

"EXEC CICS verb adverb keyword"

In this example, a verb may be used as a command name. Not all commands may include an adverb and a keyword, but they all may include a verb. For example, the following commands include both a verb and an adverb:

EXEC CICS WRITEQ TS
EXEC CICS WRITEQ TD

In this example, WRITEQ is a verb, and TS and TD are adverbs which qualify the verb.

Another example with a verb and a keyword is:

EXEC CICS LINK SYSID

In this example, LINK is a verb and SYSID is a keyword.

Continuing with the above example, a metadata file may be coded with:

WARN WRITEQ TS

In general, the metadata store with command instructions 130 may contain one entry per command to be restricted, each entry consisting of an instruction keyword followed by a verb, adverb and keyword, as required. Examples of a metadata store with command instructions 130 include the following:

WARN WRITEQ TS
DISALLOW LINK SYSID
WARN INQUIRE SYSTEM

The entries in the metadata store with command instructions 130 may be the command parameters. An EXEC CICS command may not be required in the metadata store with command instructions 130, since all CICS commands start with EXEC CICS. An entry in the metadata store with command instructions 130 of WRITEQ TS may match an API command (i.e., a high level language API command) of EXEC CICS WRITEQ TS.

Instructions may be identified by the instruction keyword at the beginning of the metadata entry. Continuing with the above example concerning the CICS® implementation, instruction keywords may include ALLOW, WARN or DISALLOW, as described previously.

The level of granularity of the instruction may be set by the parameters of the command included in the instruction in the metadata store with command instructions 130. For example, see the following two commands:
DISALLOW WRITEQ
DISALLOW WRITEQ TS
The first command (DISALLOW WRITEQ) is a more general restriction than the second command (DISALLOW WRITEQ TS), which only restricts one type of write with the inclusion of the adverb TS. The second command may be further restricted by including a keyword along with the included adverb TS.

Continuing with the above example concerning the CICS® implementation, when preparing the metadata store with command instructions 130, a runtime environment owner may view the CICS® documentation that shows all EXEC CICS commands which may be coded. An owner wishing to restrict an API command (i.e., a high level language API command) may code "DISALLOW WRITEQ TS," for example, to prevent the use of EXEC CICS WRITEQ TS commands in the runtime environment.

Figure 3:
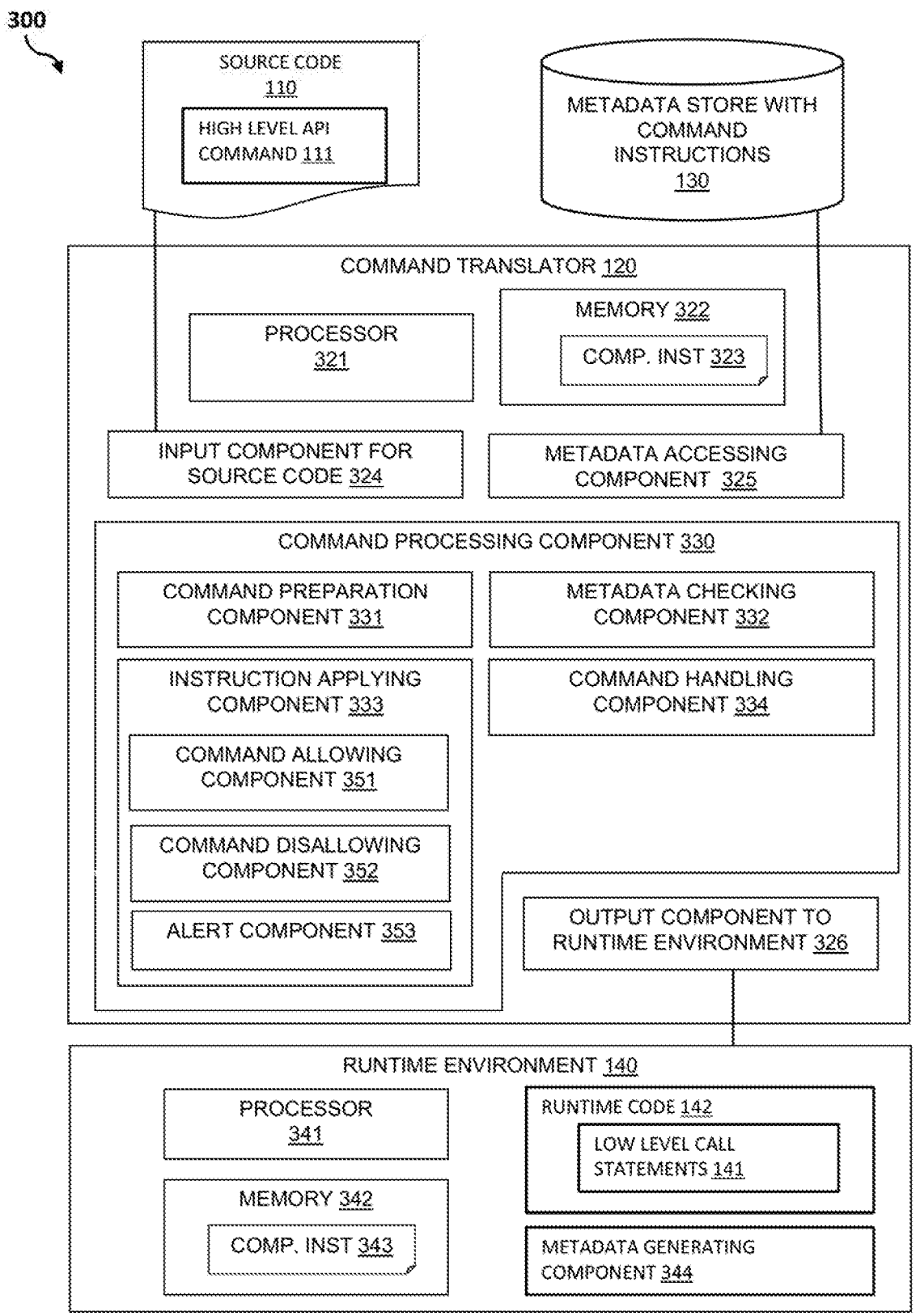
FIG. 3 is block diagram of an example embodiment of a system in accordance with the present invention.

Referring to FIG. 3, an example embodiment of a system 300 is shown including a command translator 120 for receiving and translating source code 110 for a runtime environment 140.

A command translator 120 may include at least one processor 321, a hardware module, or a circuit for executing the functions of the described components which may be software units executing on the at least one processor. Multiple processors running parallel processing threads may be provided for enabling parallel processing of some or all of the functions of the components. Memory 322 may be configured to provide computer instructions 323 to the at least one processor 321 to carry out the functionality of the components. The command translator 120 may be provided in conjunction with a compiler for source code 110. According to at least one embodiment, the functions performed by the command translator 120 may be performed by a compiler, or during a phase of compilation, as will be understood by one of ordinary skill in the art.

The command translator 120 may include an input component 324 for source code 110 and a metadata accessing component 325 for access to a metadata store with command instructions 130 with API instructions.

The command translator 120 may include a command processing component 330 for processing each API command (i.e., high level language API command) in the source code 110. The command processing component 330 may include a command preparation component 331 for preparing to process an API command and a metadata checking component 332 for checking the metadata store with command instructions 130 for the API command The command processing component 330 may include an instruction applying component 333 for applying an instruction to the source code API command (i.e., high level language API command). The command processing component 330 may include a command handling component 334 for subsequently handling the API command.

The instruction applying component 333 may include: a command disallowing component 352 for disallowing an API command (i.e., high level language API command) by instructing the command translator not to translate the API command, resulting in no valid code in the runtime environment for the API command; a command allowing component 351 for allowing an API command by instructing the command translator to activate a switched off API command in the source code resulting in valid code in the runtime environment for the API command; and an alert component 353 for instructing an alert relating to the API command when processing the API command.

A command processing component 330 may be responsible for processing an API command (i.e., high level language API command) in the source code 110. For each API command, in turn, the command processing component 330 may check whether the API command may be allowed by using the metadata checking component 332. Depending on the result of the check, the instruction applying component 333 may translate the API command as normal by utilizing the command allowing component 351, may disallow the API command by using the command disallowing component 352, or may issue a message, both for a warning or for disallowing an API command by using the alert component 353. An alert component 353 may be used for each API command, in turn, and may perform required checks and functions on each API command.

The command translator 120 may include an output component to runtime environment 326 for outputting the translated source code as runtime code 142, including low level call statements 141 in the runtime code, which may be compiled for the runtime environment 140. According to at least one embodiment, the functions performed by the command translator 120 may be performed by a compiler, or during a phase of compilation, as will be understood by one of ordinary skill in the art. The runtime environment 140 may include at least one processor 341, a hardware module, or a circuit for executing the functions of the runtime environment 140 which may be software units executing on the at least one processor. Multiple processors running parallel processing threads may be provided enabling parallel processing of some or all of the functions. Memory 342 may be configured to provide computer instructions 343 to the at least one processor 341 to carry out the functionality of the runtime environment 140 and the translated source code.

The runtime environment 140 may include a metadata generating component 344 for generating the metadata for source code 110 to specify instructions for API commands (i.e., high level language API commands) to be applied for the runtime environment 140.

Figure 4:
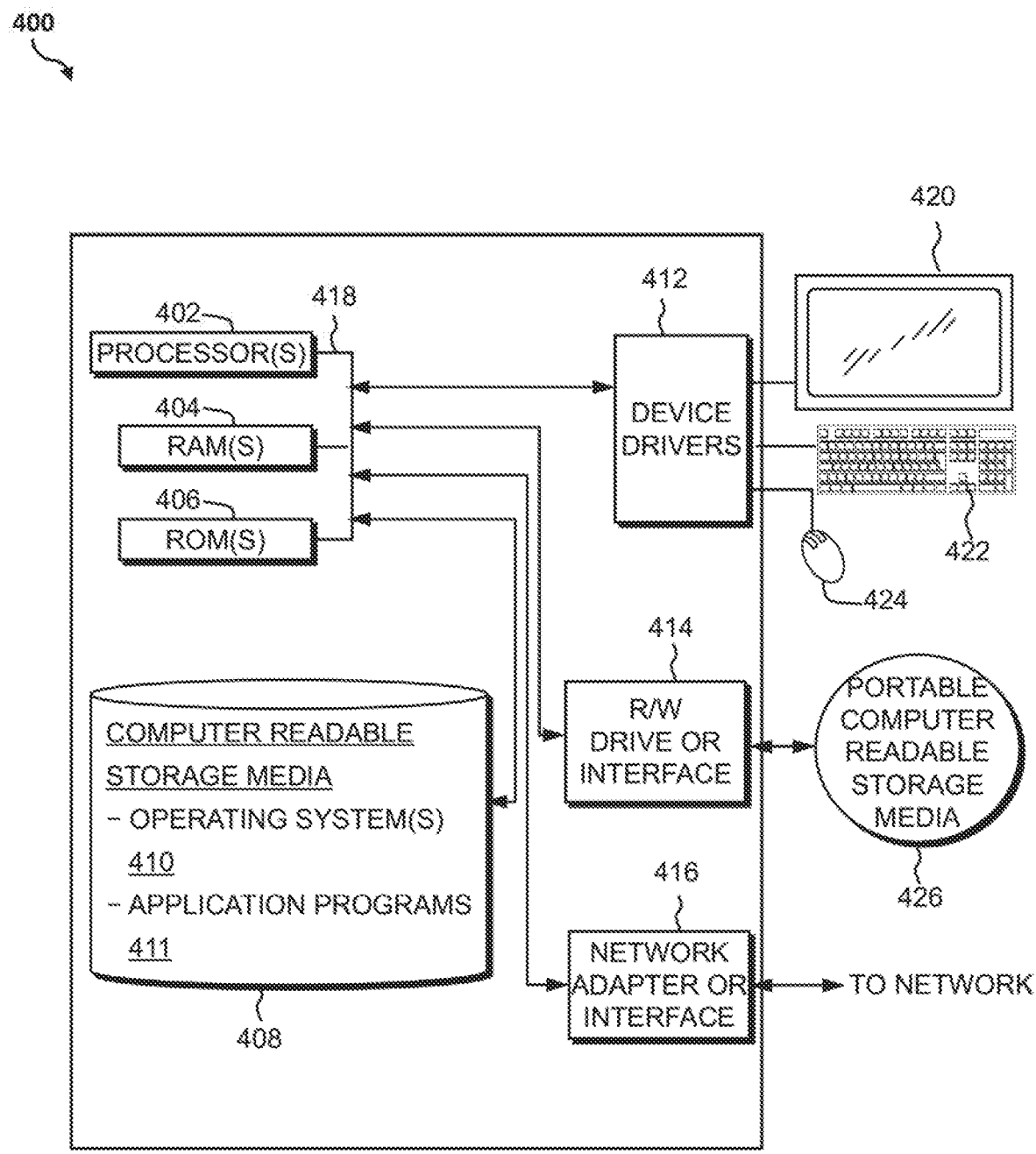
FIG. 4 is a block diagram of an embodiment of a computer system or cloud server in which the present invention may be implemented.

FIG. 4 depicts a block diagram of components of a computing device of the command translator 120 of FIG. 1, in accordance with an embodiment of the present invention. It should be appreciated that FIG. 4 provides only an illustration of one implementation and does not imply any limitations with regard to the environments in which different embodiments may be implemented. Many modifications to the depicted environment may be made.

Computing device can include one or more processors 402, one or more computer-readable RAMs 404, one or more computer-readable ROMs 406, one or more computer readable storage media 408, device drivers 412, read/write drive or interface 414, and network adapter or interface 416, all interconnected over a communications fabric 418. Communications fabric 418 can be implemented with any architecture designed for passing data and/or control information between processors (such as microprocessors, communications and network processors, etc.), system memory, peripheral devices, and any other hardware components within the system.

One or more operating systems 410, and application programs 411, are stored on one or more of the computer readable storage media 408 for execution by one or more of the processors 402 via one or more of the respective RAMs 404 (which typically include cache memory). In the illustrated embodiment, each of the computer readable storage media 408 can be a magnetic disk storage device of an internal hard drive, CD-ROM, DVD, memory stick, magnetic tape, magnetic disk, optical disk, a semiconductor storage device such as RAM, ROM, EPROM, flash memory, or any other computer readable storage media that can store a computer program and digital information, in accordance with embodiments of the invention.

Computing device can also include a R/W drive or interface 414 to read from and write to one or more portable computer readable storage media 426. Application programs 411 on computing device 110 can be stored on one or more of the portable computer readable storage media 426, read via the respective R/W drive or interface 414 and loaded into the respective computer readable storage media 408.

Computing device can also include a network adapter or interface 416, such as a TCP/IP adapter card or wireless communication adapter. Application programs 411 on computing device 110 can be downloaded to the computing device from an external computer or external storage device via a network (for example, the Internet, a local area network or other wide area networks or wireless networks) and network adapter or interface 416. From the network adapter or interface 416, the programs may be loaded into the computer readable storage media 408. The network may comprise copper wires, optical fibers, wireless transmission, routers, firewalls, switches, gateway computers and edge servers.

Computing device can also include a display screen 420, a keyboard or keypad 422, and a computer mouse or touchpad 424. Device drivers 412 interface to display screen 420 for imaging, to keyboard or keypad 422, to computer mouse or touchpad 424, and/or to display screen 420 for pressure sensing of alphanumeric character entry and user selections. The device drivers 412, R/W drive or interface 414, and network adapter or interface 416 can comprise hardware and software stored in computer readable storage media 408 and/or ROM 406.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Cloud Computing

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
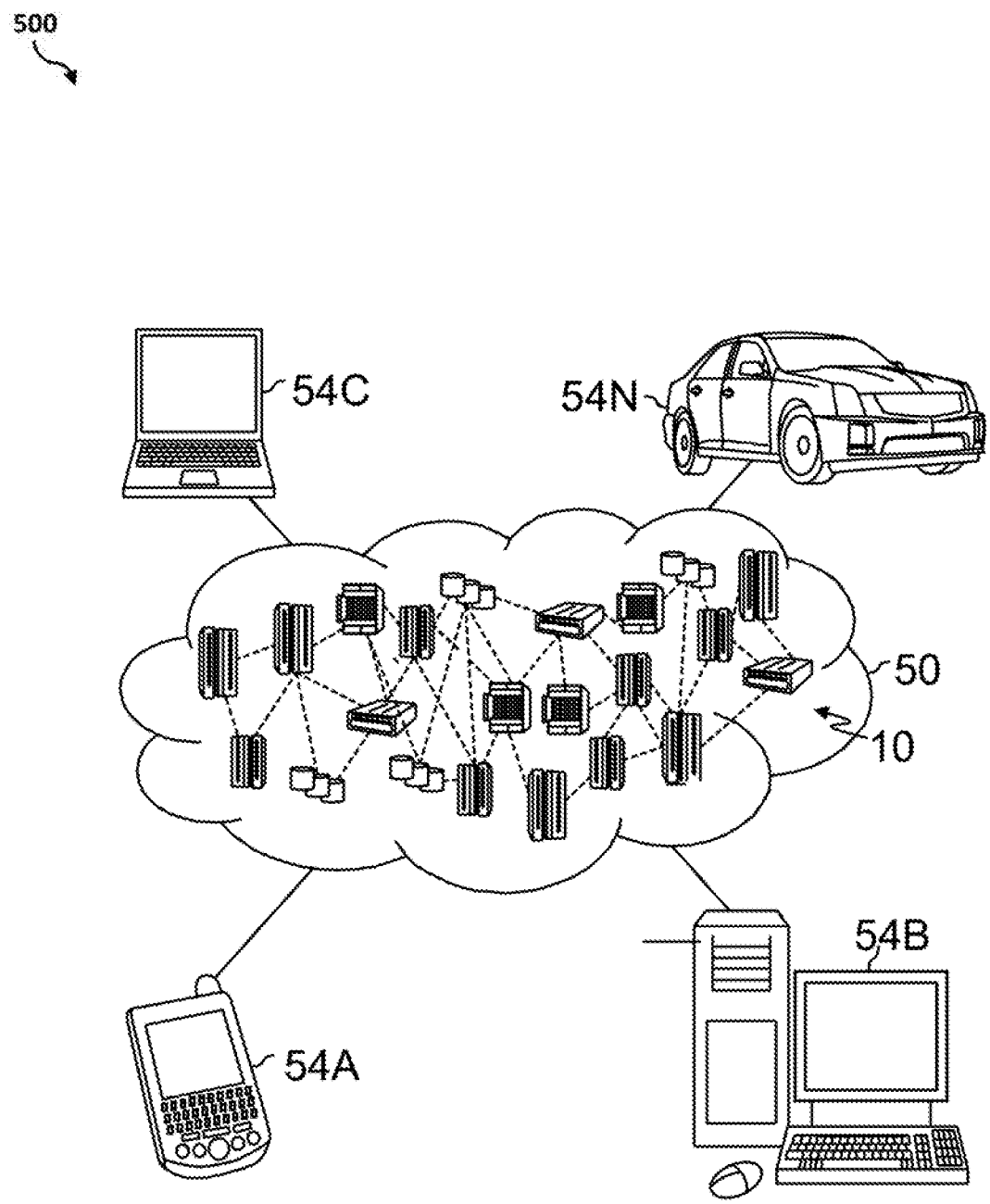
FIG. 5 is a schematic diagram of a cloud computing environment in which the present invention may be implemented.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Figure 6:
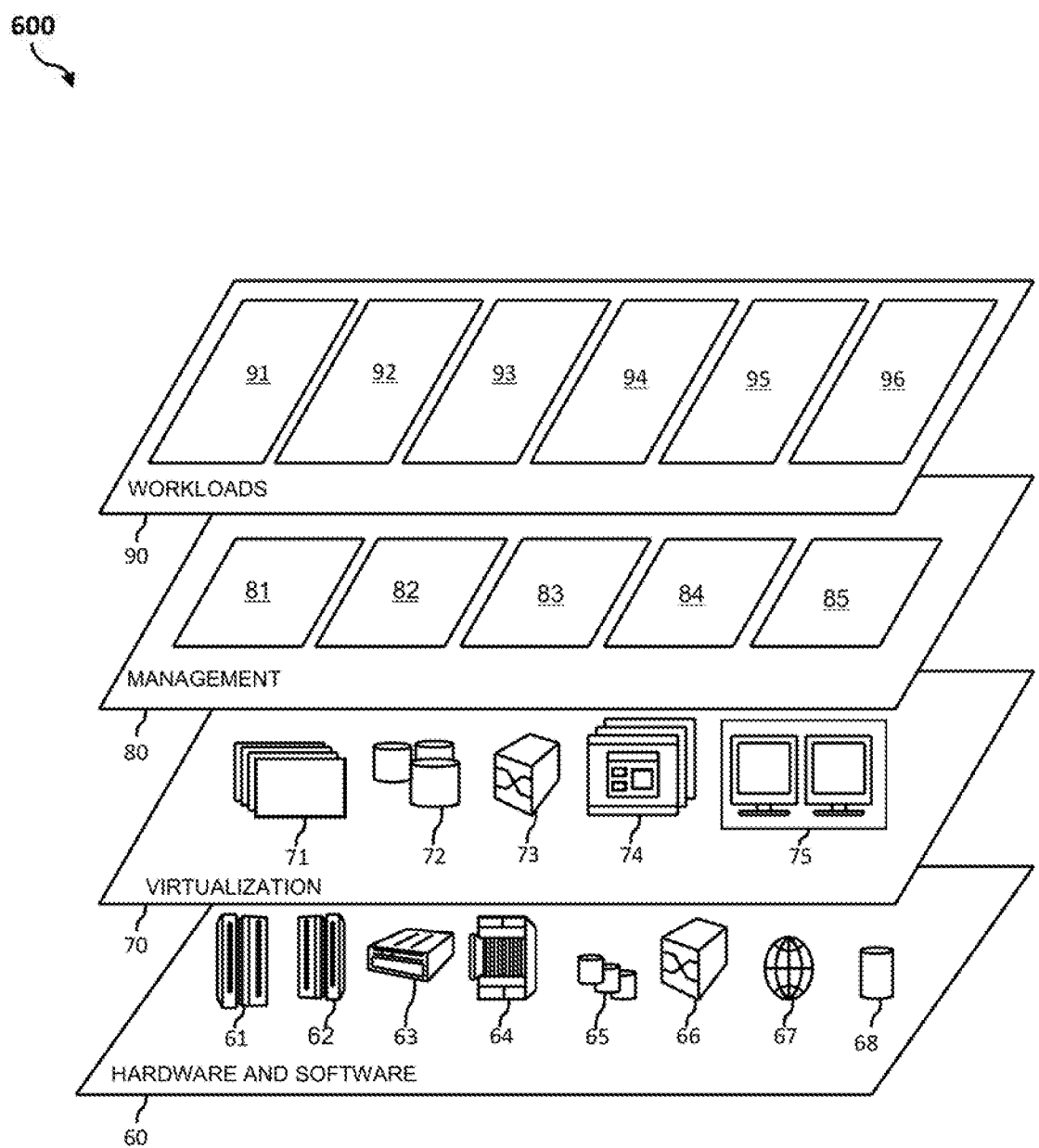
FIG. 6 is a diagram of abstraction model layers of a cloud computing environment in which the present invention may be implemented.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and command translator processing 96 of source code.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Improvements and modifications can be made to the foregoing without departing from the scope of the present invention.

What is claimed is:

1. A method for instructing the use of application programming interface (API) commands in a runtime environment, the method comprising:
   receiving, by a computer processor, a source code with a high level language API command;
   accessing, by a computer processor, metadata for the source code;
   applying, by a computer processor, an instruction included in the metadata to the high level language API command, wherein the instruction applied to the high level language API command includes issuing a warning message relating to some, but not all, parameters of the high level language API command; and
   processing, by a computer processor, the high level language API command to a low level code using a command translator based, at least in part, on the metadata.

2. The method of claim 1, wherein disallowing the high level language API command instructs the command translator not to translate the high level language API command resulting in no valid code in the runtime environment for the API command, and wherein allowing the high level language API command instructs the command translator to activate a switched oft API command in the source code resulting in a valid code in the runtime environment for the high level language API command.

3. The method of claim 1, wherein issuing a warning message relating to some, but not all, parameters of the high level language API command instructs the command translator to process the high level language API command as normal resulting in a valid code in the runtime environment, for the high level language API command.

4. The method of claim 1, wherein the instruction provides an alert relating to the high level language API command when processing the high level language API command.

5. The method of claim 1, wherein the metadata comprises an instruction keyword followed by details of the high level language API command, and determining whether the metadata includes an instruction to be applied to the high level language API command, comprising scanning the metadata to determine whether a keyword identified in the metadata matches the instruction keyword.

6. The method of claim 3, wherein a command name is a verb and a specified parameter is an adverb or a keyword on which the verb acts.

7. The method of claim 1, wherein the instruction applied to the high level language API command includes an instruction keyword identifying the instruction in relation to an identified API command.

8. The method of claim 1, wherein processing the high level language API command further comprises translating the high level language API command to a statement call in a runtime environment language.

9. The method of claim 1, further comprising:
generating metadata relating to the high level language API command in the source code by specifying an instruction for the high level language API command with a selected parameter.

10. The method of claim 9, wherein the generated metadata is generated by an owner of a runtime environment in which the instructions are applied to control a granularity of the high level language API command used in the runtime environment.

11. A computer system for instructing the use of application programming interface (API) commands in a runtime environment, comprising:
one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:
receiving, by a computer processor, a source code with a high level language API command;
accessing, by a computer processor, metadata for the source code; applying, by a computer processor, an instruction included in the metadata to the high level language API command, wherein the instruction applied to the high level language API command includes issuing a warning message relating to some, but not all, parameters of the high level language API command; and
processing, by a computer processor, the high level language API command to a low level code using a command translator based, at least in part, on the metadata.

12. The computer system of claim 11, further comprising a metadata store of metadata provided for the source code including instructions to be applied to API commands.

13. The computer system of claim 11, wherein disallowing the high level language API command instructs the command translator not to translate the high level language API command resulting in no valid code in the runtime environment for the API command, and wherein allowing the high level language API command instructs the command translator to activate a switched off API command in the source code resulting in a valid code in the runtime environment for the high level language API command.

14. The computer system of claim 11, wherein issuing a warning message relating to some, but not all, parameters of the high level language API command instructs the command translator to process the high level language API command as normal resulting in a valid code in the runtime environment for the high level language API command.

15. The computer system of claim 11, wherein the instruction provides an alert relating to the high level language API command when processing the high level language API command.

16. The computer system of claim 11, further comprising:
generating metadata relating to the high level language API command in the source code by specifying an instruction for the high level language API command with a selected parameter.

17. The computer system of claim 11, wherein a command processing component translates an API command to a statement call in a runtime environment language.

18. A computer program product for instructing the use of application programming interface (API) commands in a runtime environment, comprising:
one or more computer-readable storage media and program instructions stored on at least one of the one or more tangible storage media, the program instructions executable by a processor to cause the processor to perform a method comprising:
receiving, by a computer processor, a source code with a high level language API command;
accessing, by a computer processor, metadata for the source code; applying, by a computer processor, an instruction included in the metadata to the high level language API command, wherein the instruction applied to the high level language API command includes issuing a warning message relating to some, but not all, parameters of the high level language API command; and
processing, by a computer processor, the high level language API command to a low level code using a command translator based, at least in part, on the metadata.

* * * * *